Nov. 25, 1958     G. R. KUHNER     2,862,164
VIBRATING FEEDER CONTROL CIRCUIT
Filed Nov. 2, 1956
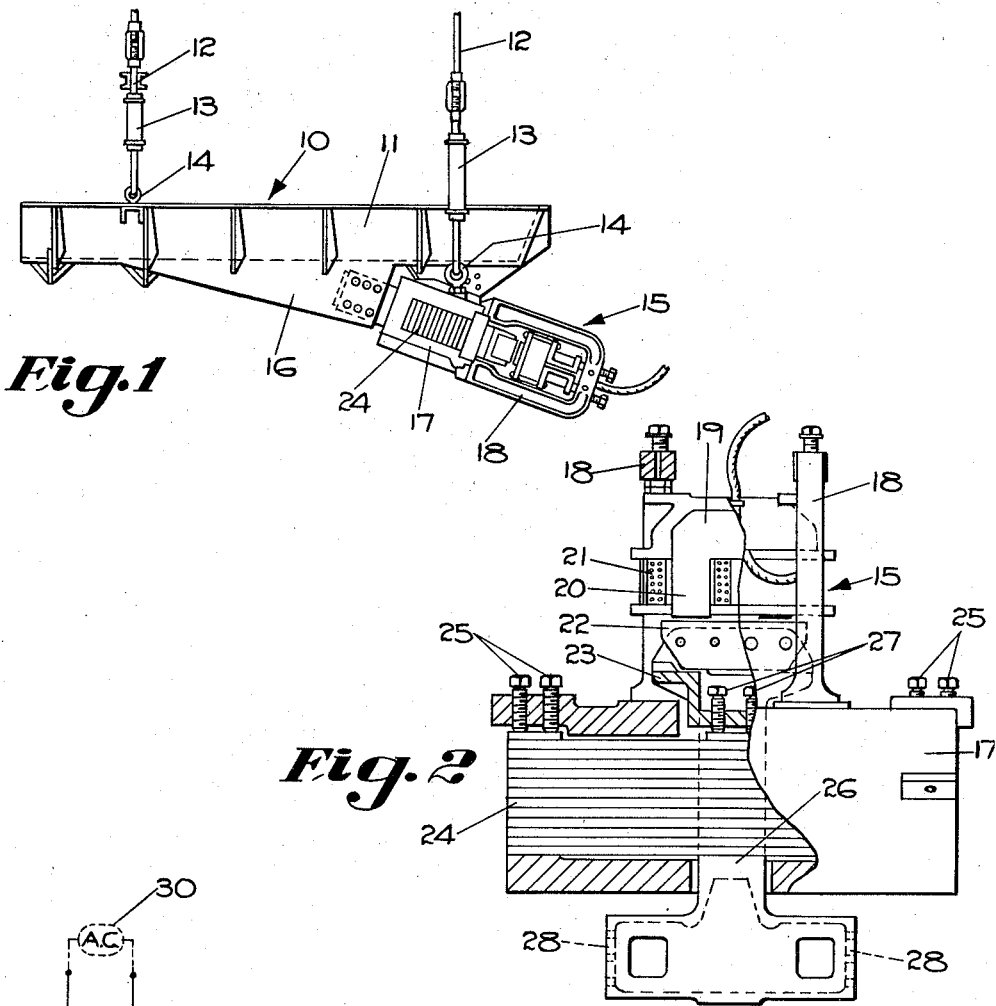
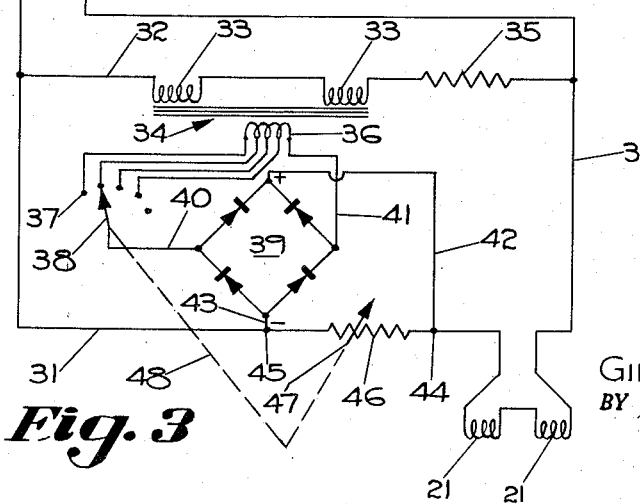
*INVENTOR;*
GILBERT R. KUHNER,
BY David Young
ATT'Y.

United States Patent Office 2,862,164
Patented Nov. 25, 1958

2,862,164

VIBRATING FEEDER CONTROL CIRCUIT

Gilbert R. Kuhner, Upper Arlington, Ohio, assignor to The Jeffrey Manufacturing Company, a corporation of Ohio Application November 2, 1956, Serial No. 619,970

15 Claims. (Cl. 318—132)

This invention relates to electrically operated vibrating feeders, and more particularly to a novel circuit for controlling the supply of electrical power to the vibrating feeder.

It is the object of this invention to provide a novel control circuit for operating a vibrating feeder with a mixed current consisting of an alternating current and a superimposed direct current.

It is a further object of the instant invention to provide a novel control circuit for operating a vibrating feeder with a mixed current consisting of an alternating current and a superimposed direct current, wherein the desired control is achieved by variations of the direct current, and including means to reduce the direct current to zero to stop the operation of the vibrating feeder.

It is another object of the instant invention to provide a novel control circuit for operating a vibrating feeder in which the feeder is operated by a mixed current consisting of an alternating current and a direct current, including a rectifier connected to the alternating current line for supplying the direct current, and means to short circuit the rectifier when the operation of the vibrating feeder is stopped.

It is still another object of the instant invention to provide a novel control circuit for operating a vibrating feeder of the electrical type, in which an alternating current is provided for the production of a pulsating magnetic field to vibrate the deck of the feeder, the control circuit operating to impose a direct current on the alternating current so that the power supplied for operating the vibrating feeder is a function of the sum of the alternating current and the direct current, the control circuit including means for varying the value of the direct current whereby a control of the power input to the vibrating feeder is achieved.

The vibrating feeder to which this invention relates comprises a vibrator operating unit including vibrator bars to which is clamped an armature which is adapted to be reciprocated in response to a pulsating magnetic field. The vibrator bars vibrate as a result of the reciprocation of the armature, and this vibration is communicated to the deck of the vibrating feeder for operating the latter to move material therealong. The aforementioned pulsating magnetic field is created by an alternating current which is supplied to coils mounted on the poles of a stator disposed adjacent the armature. Control of the operating unit is achieved by imposing a direct current on the alternating current, so that the power supplied to the vibrator operating unit is a function of the sum of the alternating current and the direct current, with means being provided for varying the value of the direct current, to thereby vary the power supplied to the vibrating feeder operating unit.

In accordance with this invention the novel control circuit includes means for producing the direct current which is imposed on the alternating current supplied to the coils on the stator, and this direct current producing means may be in the form of a rectifier, to which there is supplied an alternating current of a selected voltage according to the control that it is desired to achieve. The direct current is imposed on the alternating current by connecting the direct current producing means in series with the alternating current line to the coils. The alternating current line includes variable resistance means, which is connected across the direct current producing means to form a high resistance path back to the direct current producing means. This resistance means includes a control for varying the value thereof, and this control is ganged with selector means for controlling the supply of alternating current to the direct current producing means. Thus, when the amount of alternating current supplied to the direct current producing means is reduced for the production of a smaller direct current, the value of the resistance means is similarly reduced, since the smaller direct current being supplied by the direct current producing means requires only a smaller resistance in the circuit to reduce the flow of direct current back to the direct current producing means instead of to the load. When the supply of alternating current to the direct current producing means is reduced to zero, the resistance means is similarly reduced to zero or short circuited, and this achieves the result of shunting the alternating current, which is supplied to the stator coils, around the direct current producing means so that there will be absolutely no direct current imposed on alternating current supplied to the stator coils.

Other objects of the invention will appear hereinafter, the novel features and combinations being set forth in the appended claims.

In the accompanying drawings:

Fig. 1 is an elevational view of a vibrating feeder to which the instant invention applies;

Fig. 2 is a plan view, partially in section, of the operating unit of the vibrating feeder in Fig. 1; and Fig. 3 is a diagram of the novel control circuit for the vibrating feeder of Fig. 1.

In Fig. 1 there is illustrated a vibrating feeder 10 of the electrical operating type, which comprises a feeding deck 11 to which material is supplied, and which is adapted to move this material along the length of the deck 11 by vibration thereof. The vibrating feeder 10 may be mounted by suspension means comprising rods 12 secured to a suitable fixed structure and including vibration absorbing means 13 for the purpose of isolating the vibration of the feeder 10 from the supporting structure. The rods 12 are secured to the feeder 10 by eye bolts 14.

The deck 11 of the vibrating feeder 10 is vibrated by a vibrator operating unit 15, which is secured to the underside of the deck 11 by means of a downwardly extending plates 16 located one at either side of the deck 11. The operating unit 15 comprises a main casting 17 which is a relatively heavy element. A pair of supporting frame members 18, which are of generally U-shape, are secured to the rear of the main casting 17 to form a part of the main casting 17. The supporting frame members 18 carry the stator 19, which includes a pair of poles 20, each of which is surrounded by a coil 21.

Immediately below the poles 20 of the stator 19, as viewed in Fig. 2, there is provided an armature 22, which is spaced from the poles 20 by an air gap. The armature 22 is bolted to a center clamp 23 adapted to be secured to a stack of vibrator bars 24. The vibrator bars 24 are arranged in a stack within the main casting 17 and extend the width of the latter, with the ends of the vibrator bars 24 being fixedly clamped to the main casting 17 by means of bolts 25. The center clamp 23 comprises a heel 26 which abuts the bottom of the stack of vibrator bars 24 midway between the ends thereof. Bolts 27 are threaded into the center clamp 23 and bear against the top of the stack of vibrator bars 24 to fixedly secure the center clamp 23 to the center of the vibrator bars 24 and to force the vibrator bars 24 against the heel 26.

In the vibrating feeder operating unit 15 a pulsating magnetic field is created at the poles 20 of the stator 19 by the alternating current which is delivered to the coils 21. The armature 22 is spaced slightly from the ends of the poles 20 by a small air gap, and is caused to reciprocate by the pulsating magnetic field in the poles 20 of the stator 19. The center clamp 23, being secured to the armature 22, will reciprocate therewith and cause the vibrator bars 24 to vibrate at the center thereof, since the ends of the vibrator bars are fixedly clamped to the main casting 17.

It will be understood by those skilled in the art that in actual operation the main casting 17 also experiences some vibration. However, the main casting 17 and its associated elements are considerably heavier in weight than the vibrating elements consisting of the armature 22, the center clamp 23, and the deck 11, whereby the armature 22, the center clamp 23, and the deck 11 will experience a greater vibration than the main casting 17. Accordingly, the armature 22, the center clamp 23, and the deck 11 are termed the vibrating parts while the main casting 17 and its associated elements are termed the relatively fixed parts, or merely, the fixed parts. The center clamp 23 projects beyond the main casting 17 in a pair of transversely directed arms 28, which are adapted to be rigidly bolted to the plates 16 on the underside of the deck 11 of the vibrating feeder 10.

Referring to Fig. 3, there is illustrated the control circuit for controlling the operating unit 15 which drives the vibrating feeder 10. The control manifests itself in the degree of vibration of the deck 11 of the vibrating feeder. A greater power input to the coils 21 of the operating unit 15 will produce a greater amplitude of vibration of the deck 11 resulting in a greater rate of feed of material along the deck 11, whereas a smaller power input to the coils 21 of the operating unit 15 gives a smaller amplitude of vibration of the deck 11 with an accordingly lower rate of feed of material along the deck 11. The operating unit 15 is designed to operate on a mixed current comprising an alternating current with a superimposed direct current, whereby the power supplied to the coils 21 of the operating unit 15 is a function of the sum of the alternating current and the direct current. The aforementioned control of the vibrating feeder 10 is achieved by varying the voltage of the direct current superimposed on the alternating current from a maximum to zero. The alternating current is of such voltage that it is not alone sufficient to operate the vibrating feeder 10, and therefore, when the direct current is reduced to zero only the alternating current is supplied to the operating unit 15 and the vibrating feeder 10 is then inoperative.

The control circuit shown in Fig. 3 is connected to a source of alternating current 30, which may be of any usual form, and comprises a line 31 which connects the source of alternating current 30 to the coils 21 of the stator 19. The control circuit further includes a line 32 connected across the alternating current line 31, which supplies the voltage of the alternating current source 30 to the primary coils 33 of a step-down transformer 34. The line 32 also includes a resistance 35 connected in series with the coils 33 of the step-down transformer 34 for the purpose of increasing the resistance of this branch of the circuit to the flow of direct current, as will be described in greater detail hereinafter.

The transformer 34 includes a tapped secondary 36 which is adapted to provide an alternating current of smaller voltage than that supplied by the alternating current source 30. The tapped secondary 36 of the transformer 34 has a plurality of terminals 37 and a switch 38 cooperating with the terminals 37, to provide a selected value of alternating current from the secondary 36, ranging from the maximum output of the secondary 36 to zero. The reduced alternating current from the secondary 36 is supplied to a full wave, bridge connected rectifier 39. A line 40 from the switch 38 and a line 41 from the secondary 36 are connected across the full wave rectifier 39. A line 42 from the positive terminal of the rectifier 39 is connected to the alternating current line 31 at the junction 44, and a line 43 from the negative terminal of the rectifier 39 is similarly connected to the alternating current line 31 at the junction 45, to connect the direct current output of the rectifier 39 to the alternating current line 31, to impose the direct current output of the rectifier 39 on the alternating current carried by the alternating current line 31.

The alternating current line 31 includes a variable resistance 46, which is connected across the rectifier 39 between the lines 42, 43 from the positive and negative terminals, respectively, of the rectifier 39. The resistance 46 causes the path between the junctions 44, 45 to be of relatively high resistance relative to the resistance of the coils 21 whereby substantially all of the direct current from the rectifier 39 will flow through the line 31 to the coils 21. Control means 47 is provided for varying the value of the resistance 46 and the control means 47 is ganged 48 with the switch 38, whereby the value of the resistance 46 is adjusted simultaneously in accordance with the voltage of the alternating current that is supplied to the rectifier 39. Thus, as the voltage of the alternating current supplied to the rectifier 39 is reduced, the value of the resistance 46 is similarly reduced, and when the input to the rectifier is zero the resistance 46 is also reduced to zero, or short circuited, for a purpose to be described in greater detail below.

In the operation of the control circuit the line 31 supplies alternating current from the source 30 to the coils 21 on the stator 19. The variable resistance 46 in the line 31 is of low impedance and, therefore, has negligible effect on the alternating current carried by the line 31. The line 32 is connected across the line 31 and supplies the alternating current from the source 30 to the primary coils 33 of the step-down transformer 34. The secondary coil 36 of the stepdown transformer 34 provides an alternating current of a substantially lower voltage than the alternating current supplied by the source 30. The secondary 36 of the step-down transformer 34 is tapped and provided with terminals 37 in order to produce a selected voltage alternating current for the rectifier 39. The voltage of the alternating current supplied to the rectifier 39 ranges from the maximum output of the secondary 36 to zero.

The rectifier 39 will produce a direct current of a substantially lower voltage than the voltage of the alternating current provided by the source 30, due to the lower voltage alternating current supplied by the secondary 36 to the rectifier 39. A direct current of a substantially lower voltage than the voltage of the alternating current provided by the source 30 may be utilized for controlling the power supplied to the coils 21 for the reason that both the direct current and the alternating current are supplied to the coils 21, and the coils 21 being of high impedance and low resistance, the high voltage alternating current and the low voltage direct current will both produce substantially the same amperage when the maximum voltage output of the secondary 36 is supplied to the rectifier 39. The output of the rectifier 39 is connected by lines 42, 43 to the line 31 to impose the direct current produced thereby on the alternating current provided by the source 30. The variable resistance 46 in the line 31 is connected between the lines 42, 43 across the rectifier 39, forming a high resistance path between junctions 44, 45 for the direct current flowing from the rectifier 39, whereby substantially all of the direct current flows in the opposite direction to the coils 21. The value of the resistance 46 required to achieve this result varies with the voltage of the direct current supplied by the rectifier 39. Accordingly, as the voltage of the direct current produced by the rectifier 39 is increased or decreased, in accordance with the voltage of the alternating current input to the rectifier 39, the resistance 46 is also increased or decreased, and the control 47 for varying the resistance 46 is ganged 48 with the selector switch 38 which regulates the alternating current input to the rectifier 39.

The resistance 46 has a very small impedance, and therefore, is of negligible effect on the alternating current carried in the line 31. However, in order to achieve the bottom limit of control it is required that the rectifier 39 produce no direct current. This makes it necessary to avoid by-passing any alternating current from the line 31 through the rectifier 39, when it is desired to attain the bottom limit of control. Therefore, when the alternating current input to the rectifier 39 from the secondary 36 is reduced to zero, the resistance 46 is similarly reduced to zero, or is in effect short circuited, so that the alternating current from source 30 will flow solely through the line 31. In this way the bottom limit of control is achieved with no direct current being imposed on the alternating current in the line 31, whereby the current supplied to the coils 21 is solely that provided by the source 30, providing insufficient power in the operating unit 15 to vibrate the deck 11 of the vibrating feeder 10.

The resistance 35 is provided in the line 32 to prevent any substantial flow of direct current through the coils 33 of the step-down transformer 34. The resistance 35 is of low impedance, and therefore, has negligible effect on the alternating current supplied to the coils 33, but is of relatively high resistance compared to the resistance of the coils 21, so that at most only a negligible direct current will flow in the line 32.

It will be understood that the control of the power input to the operating unit 15 depends on the voltage of the direct current supplied by the rectifier 39, since the power supplied to the operating unit 15 is a function of the sum of the alternating current from the source 30 and the direct current from the rectifier 39. Since the alternating current alone provides insufficient power to operate the vibrating feeder 10, reduction of the direct current from the rectifier 39 to zero, renders the vibrating feeder inoperative.

It is accordingly seen that the control circuit described herein gives a bottom limit of control in which no direct current is superimposed on the alternating current, and therefore, the feeder remains inoperative. The direct current is reduced by a reduction of the alternating current input to the rectifier, and when this alternating current input is reduced to zero, the rectifier is short circuited so that for all practical purposes it is no longer in the circuit and there is no likelihood of any of the alternating current from the source being converted to direct current, and accordingly, the button limit of control is thereby achieved.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a vibrating feeder having a conveying deck adapted to be vibrated to feed material therealong, a vibrator operating unit connected to the deck for imparting vibrations thereto, said operating unit comprising vibrating means and an armature secured to the vibrating means, a stator including coil means for providing a pulsating magnetic field to vibrate the armature and the vibrating means, means for supplying current to the coil means to produce said pulsating mangetic field including a control circuit comprising, a source of alternating current, a line connecting said source of alternating current to said coils for producing the pulsating magnetic field, means for converting an alternating current to a direct current connected to the alternating current line to impose a direct current on the alternating current supplied to the coils for controlling the input to the coils, a variable source of alternating current connected to the current converting means for varying the alternating current input to the current converting means, variable resistance means in the alternating current line connected across the current converting means, and means for varying the value of the variable resistance means in accordance with the change of the alternating current input to the current converting means.

2. In a vibrating feeder having a conveying deck adapted to be vibrated to feed material therealong, a vibrator operating unit connected to the deck for imparting vibrations thereto, said operating unit comprising vibrating means and an armature secured to the vibrating means, a stator including coil means for providing a pulsating magnetic field to vibrate the armature and the vibrating means, means for supplying current to the coil means to produce said pulsating magnetic field including a control circuit comprising, a source of alternating current, a line connecting the source of alternating current to the coils, a rectifier for poducing a direct current, a variable supply of alternating current connected to the input of the rectifier, means for varying the supply of alternating current to the rectifier, the direct current output of the rectifier being connected to the alternating current line to impose the direct current on the alternating current supplied to the coils, variable resistance means in the alternating current line connected across the output of the rectifier, and means for varying the value of the variable resistance means in accordance with the change of the alternating current input to the rectifier.

3. In a vibrating feeder having a conveying deck adapted to be vibrated to feed material therealong, a vibrator operating unit connected to the deck for imparting vibrations thereto, said operating unit comprising vibrating means and an armature secured to the vibrating means, a stator including coil means for providing a pulsating magnetic field to vibrate the armature and the vibrating means, means for supplying current to the coil means to produce said pulsating magnetic field including a control circuit comprising, a source of alternating current, a line connecting the source of alternating current to the coils, a rectifier for producing a direct current, a variable supply of alternating current connected to the input of the rectifier, means for varying the supply of alternating current to the rectifier, the direct current output of the rectifier being connected to the alternating current line to impose the direct current on the alternating current supplied to the coils, variable resistance means in the alternating current line connected across the output of the rectifier, control means for varying the value of the variable resistance means, said control means being ganged with the means for varying the supply of alternating current to the rectifier to vary the value of the resistance means simultaneously with the change of the alternating current input to the rectifier.

4. In a vibrating feeder having a conveying deck adapted to be vibrated to feed material therealong, a vibrator operating unit connected to the deck for imparting vibrations thereto, said operating unit comprising vibrating means and an armature secured to the vibrating means, a stator including coil means for providing a pulsating magnetic field to vibrate the armature and the vibrating means, means for supplying current to the coil means to produce said pulsating magnetic field including a control circuit comprising, a source of alternating current, a line connecting the source of alternating current to the coils, step-down transformer means connected across the alternating current line for producing a reduced alternating current, said transformer means including a tapped secondary and selector switch means connected to the secondary to provide a selected value of alternating current, a full wave rectifier, the transformer secondary and the selector switch means being connected across the full wave rectifier to supply the selected value of alternating current to the rectifier to produce a direct current, the output of the rectifier being connected to the alternating current line to impose the direct current on the alternating current supplied to the coils for controlling the input to the coils, variable resistance means in the alternating current line connected across the output of the rectifier, control means for varying the value of the variable resistance means, said control means being ganged with said transformer secondary switch means to vary the value of the resistance means simultaneously with the change of the output of the transformer secondary.

5. In a vibrating feeder having a conveying deck adapted to be vibrated to feed material therealong, a vibrator operating unit connected to the deck for imparting vibrations thereto, said operating unit comprising vibrating means and an armature secured to the vibrating means, a stator including coil means for providing a pulsating magnetic field to vibrate the armature and the vibrating means, means for supplying current to the coil means to produce said pulsating magnetic field including a control circuit comprising, a source of alternating current, a line connecting said source of alternating current to said coils, step-down transformer means connected across the alternating current line for producing a reduced alternating current, said transformer means including a tapped secondary and selector switch means connected to the secondary to provide a selected value of alternating current ranging from the maximum output of the secondary to zero, a full wave rectifier, the transformer secondary and the selector switch means being connected across the full wave rectifier to supply the selected value of alternating current to the rectifier to produce a direct current, the output of the rectifier being connected to the alternating current line to impose the direct current on the alternating current supplied to the coils for controlling the input to the coils, variable resistance means in the alternating current line connected across the output of the rectifier, control means for varying the value of the variable resistance means, said control means being ganged with said transformer secondary switch means to vary the value of the resistance means simultaneously with the change of the output of the transformer secondary and short circuiting the variable resistance means when the output of the transformer secondary is reduced to zero.

6. A circuit for controlling the input of current to the coils of a vibrator operating unit in a vibrating feeder comprising, a source of alternating current, a line connecting said source of alternating current to said coils for producing a pulsating magnetic field, step-down transformer means connected across the alternating current line for producing a reduced alternating current, said transformer means including a tapped secondary and selector switch means connected to the secondary to provide a selected value of alternating current, a full wave rectifier, the transformer secondary and the selector switch means being connected across the full wave rectifier to supply the selected value of alternating current to the rectifier to produce a direct current, the output of the rectifier being connected to the alternating current line to impose the direct current on the alternating current supplied to the coils for controlling the input to the coils, variable resistance means in the alternating current line connected across the output of the rectifier, control means for varying the value of the variable resistance means, said control means being ganged with said transformer secondary switch means to vary the value of the resistance means in accordance with the change of the output of the transformer secondary.

7. A circuit for controlling the input of current to the coils of a vibrator operating unit in a vibrating feeder comprising, a source of alternating current, a line connecting said source of alternating current to said coils for producing a pulsating magnetic field, step-down transformer means connected across the alternating current line for producing a reduced alternating current, said transformer means including a tapped secondary and selector switch means connected to the secondary to provide a selected value of alternating current, a full wave rectifier, the transformer secondary and the selector switch means being connected across the full wave rectifier to supply the selected value of alternating current to the rectifier to produce a direct current, the output of the rectifier being connected to the alternating current line to impose the direct current on the alternating current supplied to the coils for controlling the input to the coils, variable resistance means in the alternating current line connected across the output of the rectifier, and means for varying the value of the variable resistance means in accordance with the change of the alternating current input to the full wave rectifier.

8. A circuit for controlling the input of current to the coils of a vibrator operating unit in a vibrating feeder comprising, a source of alternating current, a line connecting said source of alternating current to said coils for producing a pulsating magnetic field, a rectifier, a variable source of alternating current connected to the rectifier to produce a direct current, means for varying the supply of alternating current to the rectifier, the direct current output of the rectifier being connected to the alternating current line to impose the direct current on the alternating current supplied to the coils for controlling the input to the coils, variable resistance means in the alternating current line connected across the output of the rectifier, control means for varying the value of the variable resistance means, said control means being ganged with the means for varying the supply of alternating current to the rectifier to vary the value of the resistance means simultaneously with the change of the alternating current input to the rectifier.

9. A circuit for controlling the input of current to the coils of a vibrator operating unit in a vibrating feeder comprising, a source of alternating current, a line connecting said source of alternating current to said coils for producing a pulsating magnetic field, a rectifier, a variable source of alternating current connected to the rectifier to produce a direct current, means for varying the supply of alternating current to the rectifier, the direct current output of the rectifier being connected to the alternating current line to impose the direct current on the alternating current supplied to the coils for controlling the input to the coils, variable resistance means in the alternating current line connected across the output of the rectifier, and means for varying the value of the variable resistance means in accordance with the change of the alternating current input to the rectifier.

10. A circuit for controlling the input of current to the coils of a vibrator operating unit in a vibrating feeder comprising, a source of alternating current, a line connecting said source of alternating current to said coils for producing a pulsating magnetic field, step-down transformer means connected across the alternating current line for producing a reduced alternating current, said transformer means including a tapped secondary and selector switch means connected to the secondary to provide a selected value of alternating current ranging from the maximum output of the secondary to zero, a full wave rectifier, the transformer secondary and the selector switch means being connected across the full wave rectifier to supply the selected value of alternating current to the rectifier to produce a direct current, the output of the rectifier being connected to the alternating current line to impose the direct current on the alternating current supplied to the coils for controlling the input to the coils, variable resistance means in the alternating current line connected across the output of the rectifier, control means for varying the value of the variable resistance means, said control means being ganged with said transformer secondary switch means to vary the value of the resistance means in accordance with the change of the output of the transformer secondary and short circuiting the variable resistance means when the output of the transformer secondary is reduced to zero.

11. A circuit for controlling the input of current to the coils of a vibrator operating unit in a vibrating feeder comprising, a source of alternating current, a line connecting said source of alternating current to said coils for producing a pulsating magnetic field, step-down transformer means connected across the alternating current line for producing a reduced alternatnig current, said transformer means including a tapped secondary and selector switch means connected to the secondary to provide a selected value of alternating current, means for converting the output of the transformer secondary to a direct current, said current converting means being connected to the alternating current line to impose the direct current on the alternating current supplied to the coils for controlling the input to the coils, variable resistance means in the alternating current line connected across the current converting means, control means for varying the value of the variable resistance means, said control means being tied to said transformer secondary switch means to vary the value of the resistance means in accordance with the change of the output of the transformer secondary.

12. A circuit for controlling the input of current to the coils of a vibrator operating unit in a vibrating feeder comprising, a source of alternating current, a line connecting said source of alternating current to said coils for producing a pulsating magnetic field, step-down transformer means connected across the alternating current line for producing a reduced alternating current, said transformer means including a tapped secondary and selector switch means connected to the secondary to provide a selected value of alternating current, means for converting the output of the transformer secondary to a direct current, said current converting means being connected to the alternating current line to impose the direct current on the alternating current supplied to the coils for controlling the input to the coils, variable resistance means in the alternating current line connected across the current converting means, and means for varying the value of the variable resistance means in accordance with the change of the alternating current input to the current converting means.

13. A circuit for controlling the input of current to the coils of a vibrator operating unit in a vibrating feeder comprising, a source of alternating current, a line connecting said source of alternating current to said coils for producing a pulsating magnetic field, means for converting an alternating current to a direct current connected to the alternating current line to impose a direct current on the alternating current supplied to the coils for controlling the input to the coils, a variable source of alternating current connected to the current converting means including switch means for varying the alternating current input to the current converting means, variable resistance means in the alternating current line connected across the current converting means, control means for varying the value of the variable resistance means, said control means being ganged with said switch means to vary the value of the resistance means simultaneously with the change of the alternating current input to the current converting means.

14. A circuit for controlling the input of current to the coils of a vibrator operating unit in a vibrating feeder comprising, a source of alternating current, a line connecting said source of alternating current to said coils for producing a pulsating magnetic field, means for converting an alternating current to a direct current connected to the alternating current line to impose a direct current on the alternating current supplied to the coils for controlling the input to the coils, a variable source of alternating current connected to the current converting means including switch means for varying the alternating current input to the current converting means from a maximum to zero, variable resistance means in the alternating current line connected across the current converting means, control means for varying the value of the variable resistance means, said control means being ganged with said switch means to vary the value of the resistance means simultaneously with the change of the alternating current input to the current converting means and short circuiting the variable resistance means when the input of alternating current to the current converting means is reduced to zero.

15. A circuit for controlling the input of current to the coils of a vibrator operating unit in a vibrating feeder comprising, a source of alternating current, a line connecting said source of alterating current to said coils for producing a pulsating magnetic field, means for converting an alternating current to a direct current connected to the alternating current line to impose a direct current on the alternating current supplied to the coils for controlling the input to the coils, a variable source of alternating current connected to the current converting means including switch means for varying the alternating current input to the current converting means, variable resistance means in the alternating current line connected across the current converting means, and means for varying the value of the variable resistance means in accordance with the change of the alternating current input to the current converting means.

References Cited in the file of this patent

UNITED STATES PATENTS 2,472,367    Corbyn _____ June 7, 1949